United States Patent [19]
Bechert

[11] Patent Number: 5,971,326
[45] Date of Patent: Oct. 26, 1999

[54] SURFACE FOR A WALL SUBJECT TO A TURBULENT FLOW SHOWING A MAIN DIRECTION OF FLOW

[75] Inventor: Dietrich W. Bechert, Berlin, Germany

[73] Assignee: Deutsch Forschungsanstalt fur Luft-und Raumfahrt e.V., Bonn, Germany

[21] Appl. No.: 08/975,239

[22] Filed: Nov. 21, 1997

[30] Foreign Application Priority Data

Dec. 5, 1996 [DE] Germany .......................... 196 50 439

[51] Int. Cl.⁶ .................................................. B64C 21/10
[52] U.S. Cl. .......................................... 244/200; 244/130
[58] Field of Search ..................................... 244/130, 200

[56] References Cited

U.S. PATENT DOCUMENTS

| | | | |
|---|---|---|---|
| 4,650,138 | 3/1987 | Grose ...................................... | 244/130 |
| 4,907,765 | 3/1990 | Hirschel et al. ........................ | 244/200 |
| 4,930,729 | 6/1990 | Savill ..................................... | 244/200 |
| 4,986,496 | 1/1991 | Marentic et al. ........................ | 244/130 |
| 5,386,955 | 2/1995 | Savill ..................................... | 244/200 |

FOREIGN PATENT DOCUMENTS

| | | | |
|---|---|---|---|
| 0 205 289 | 12/1986 | European Pat. Off. . | |
| 3534293A1 | 4/1987 | Germany . | |
| 91/01247 | 2/1991 | WIPO .................................... | 244/200 |

OTHER PUBLICATIONS

Michael J. Walsh, "Drag Characteristics of V–Groove and Transverse Curvature Riblets"; Technical Briefs, vol. 5, No. 2, NASA LRC, Hampton, Va., 1980.

Pulles, C.J.A., "Drag Reduction of Turbulent Boundary Layers by Means of Grooved Surfaces," 1988, pp. i–119.

Bechert, D.W. et al., "The Berlin oil channel for drag reduction research,"*Experiments in Fluids* 12, pp. 251–260 (1992).

Walsh, M.J., "Viscous Drag Reduction in Boundary Layers," vol. 123, Progress in Astronautics and Aeronautics, 1990, pp. 203–261.

Bechert, D.W. et al., "Experiments on drag reducing surfaces and their optimization with an adjustable geometry," pp. 59–87, Journal of Fluid Mechanics, vol. 338, May 10, 1997.

Bruse, M. et al., "Experiments with conventional and with novel adjustable drag–reducing surfaces," International Conference on Near–Wall Turbulent Flows, Tempe, AZ, Mar. 1993, pp. 1–20.

*Primary Examiner*—Michael J. Carone
*Assistant Examiner*—Christopher K. Montgomery
*Attorney, Agent, or Firm*—Womble Carlyle Sandridge & Rice, PLLC

[57] ABSTRACT

A surface (2) is intended for a wall which is subject to a turbulent flow with a main direction of flow. The surface (2) has projecting ribs (6) oriented in the main direction of flow and spaced laterally to the main direction of flow. The height (8) of the ribs is in the range of 45% to 60% of the lateral distance between the ribs. The ribs (6) are wedge-shaped with a wedge angle (7) in the range of 20° to 50°.

6 Claims, 3 Drawing Sheets

SURFACE FOR A WALL SUBJECT TO A TURBULENT FLOW SHOWING A MAIN DIRECTION OF FLOW

FIELD OF THE INVENTION

The invention refers to a surface for a wall subject to a turbulent flow showing a main flow direction, the surface comprising projecting ribs oriented in the main direction of flow and spaced laterally to the main direction of flow, the height of the ribs being 45% to 60% of their lateral distance.

BACKGROUND OF THE INVENTION

Surfaces of the type described above serve for a reduction in turbulent exchange of momentum between the flow and the wall at the surface. Inasmuch as this is achieved, a reduction in the wall friction appears.

A surface of the above-mentioned type is described by M. Bruse, D. W. Bechert, J. G. T. van der Hoeven, W. Hage and G. Hoppe: Experiments with conventional and with novel adjustable drag-reducing surfaces, Int. Conf. on Near-Wall Turbulent Flows, Tempe, Ariz., USA, 15th to 18th Mar. 1993, Proceedings published by ELSEVIER, Amsterdam. In this case, the ribs are shaped like straight lines with respect to their cross section. At a rib height of 50% of the lateral distance between the ribs, a reduction in the wall friction of up to 10% is obtained provided that the lateral distance between ribs is optimally adjusted to the individual flow. Nevertheless, this well-known surface is unsuitable for technological applications, for example on airplanes, as ribs with straight line cross sections are difficult to produce and do not offer sufficient stability.

From EP 0 205 289 A 1, various surfaces for a wall subject to a turbulent flow showing a main direction of flow are known. In every case, the surface comprises a multitude of ribs which directly border each other and which are arranged in the main direction of flow. With wedge-shaped rib structures, as described in the older European patent applications, the lateral distance between the ribs and the height of the ribs are equal.

Although EP 0 205 289 A 1 claims that the surfaces described could result in a reduction in wall friction of up to 10% and more, there is no solid verification for this claim.

For a long time, wall friction measurements were only possible with a measurement accuracy of ±2%. Only since the construction of a special test installation, the Berlin Oil Channel, measurement accuracies of ±0.3% have been able to be obtained. [D. W. Bechert, G. Hoppe, J. G. T. van der Hoeven and R. Makris: The Berlin oil channel for drag reduction research, Exp. in Fluids 12, 251 to 260 (1992)]. By means of the utilization of oil as a fluid, flow measurements could be carried out on larger ribs. This eases the production of reproducible test surfaces. Furthermore, the measurement accuracy for wall friction measurement has been modified by a comparison in wall friction forces using a smooth reference surface as opposed to absolute wall friction measurements. An examination of the surface known from the EP 0 205 289 A 1 with wedge-shaped ribs showed a maximum reduction in the wall friction of approximately 5%. A reduction in the wall friction by 10% and more mentioned in the older European patent application could not be confirmed.

OBJECT OF THE INVENTION

It is the object of the invention to provide a surface of the type described above which exhibits a maximum reduction in the wall friction and which is, among others, easy to produce and offers excellent rib stability.

SUMMARY OF THE INVENTION

The invention provides a surface for a wall subject to a turbulent flow showing a main flow direction, the surface comprising projecting ribs oriented in the main direction of flow and spaced laterally to the main direction of flow, the height of the ribs being 45% to 60% of their lateral distance, wherein the ribs are wedge-shaped with a wedge angle in the range of 20° to 50°. The invention uses the distinct lateral distance between ribs from the known arrangement of the known straight line cross section ribs. Although wedge-shaped ribs are already known from EP 0 205 289 A 1, the wedge angle of the invention is, however, significantly sharper and provided for ribs with a lateral distance between them. With the invention, the wall friction can be distinctly reduced by over 7% in comparison to a smooth surface, and this for given rib dimensions for a comparably large flow speed range on walls subject to a turbulent flow. By adapting the surface to a flow with a specified speed, a reduction in wall friction of up to 8.5% can be obtained.

A standardized lateral distance between ribs s+, which is calculated using $$s^+ = (s/ny) * \sqrt{(tau_o/rho)}$$

where s is the absolute, non-standardized lateral distance between the ribs, $tau_o$ is a wall shear stress of a smooth reference surface, which is subject to the same flow, rho is the density of the fluid and ny is the kinematic viscosity of the fluid, is preferably in the range of 12 to 22. The optimum range is between 16 and 18, i.e. at an $s^+$ value of approximately 17.

It is understood that the standardized lateral distance $s^+$ between the ribs is to be adapted to the flow speed normally appearing at the individual wall subject to the turbulent flow. This means, for example, for a surface of a vehicle or an airplane that the standard distance between ribs s+ is to be adapted to the cruise speed of the vehicle or airplane. The resulting actual distance between the ribs s is usually in the range of 0.04 to 0.10 mm. This means that the surface shows a fine and almost microscopic structure caused by the ribs.

It is not obligatory for this invention that, in cross section, the ribs and the surface sections lying between them are limited by straight lines. The surface can be rounded to a certain degree to further ease their production and to increase their stability. However, the attachment bases of the ribs should not exceed a radius of curvature of maximum 20% of the lateral distance between the ribs. Between the ribs, the surface should not have a smaller radius of curvature than twice the lateral distance between the ribs.

Actually, by the distance between the ribs, the lateral grid measurement of the ribs is meant and not the clearance between two adjacent ribs. However, in this invention such clearance always exists.

In the following the invention is further explained and described on the basis of preferred embodiments.

DETAILED DESCRIPTION OF THE PREFERRED EMBODIMENTS

Figure 1:
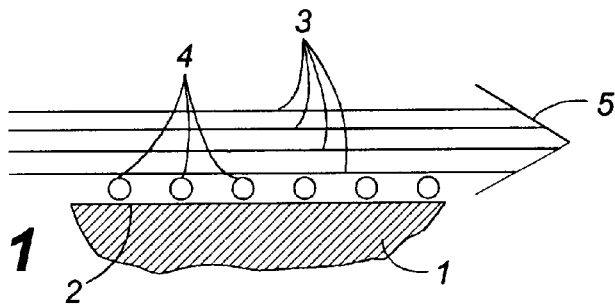
FIG. 1 is a cross sectional view of a wall subject to a turbulent flow along the main direction of flow.

In FIG. 1, a wall 1 having a surface 2 is depicted schematically. The wall 1 is subject to a turbulent flow 3. The flow 3 is represented by flow lines. By the flow 3, vortices 4 are formed at the surface, which qualifies the flow 3 at the wall 1 as being turbulent. Apart from the vortices 4, the flow 3 moves in a main direction of flow 5 as indicated by the point of an arrow.

Figure 2A:
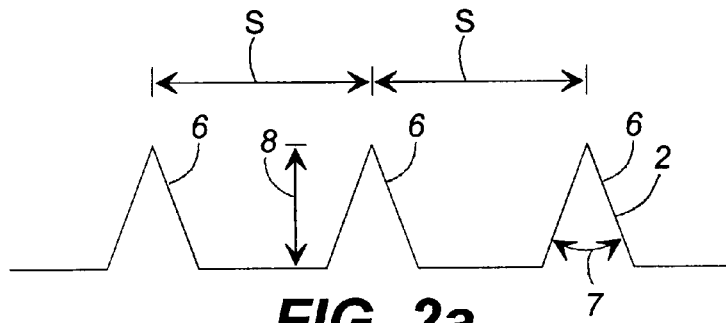
FIG. 2a and 2b show two embodiments of the surface of a wall subject to turbulent flow in cross section perpendicular to the main direction of flow according to FIG. 1.

The surface 2 of the wall 1 shows a surface structure which, however, for example in adjustment to the flow on a passenger airplane, is very fine. The structure of the surface 2 is represented scaled up in FIG. 2 in the form of two exemplary embodiments. The surface 2 shows several ribs 6 arranged side by side and aligned in the main direction of flow 5 according to FIG. 1. The ribs 6 show a lateral distance s between the ribs, and the ribs 6 have a wedge shape with a wedge angle 7. According to FIG. 2a.), the wedge angle 7 is 45°, according to FIG. 2b.) it is 30°. The height 8 of the ribs 6 is s/2. The cross sections through the surface 2 are basically composed of straight lines. On the one hand, the straight lines form the border of the ribs 6 and, on the other hand, they form the surface sections between the ribs 6.

Figure 2B:
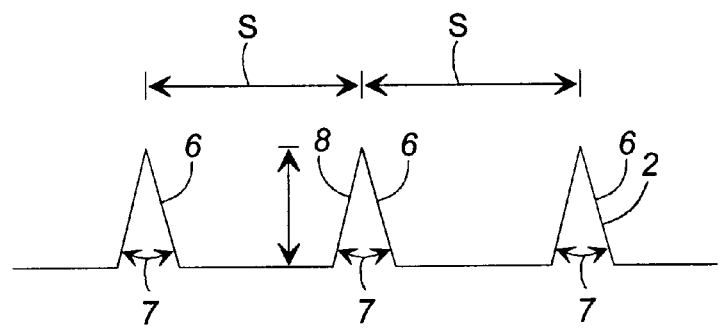
Figure 3:
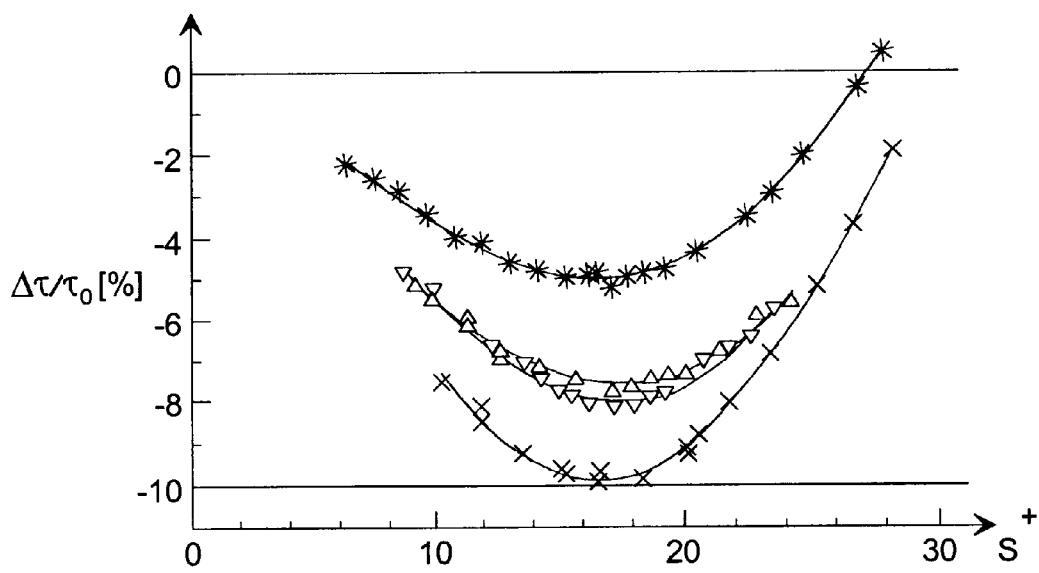
FIG. 3 is a graph for reduction in wall friction using the surfaces according to FIG. 2, FIG. 4A and 4B are representations of two state of the art surfaces, giving comparative values in the graph of FIG. 3, and, FIG. 5 is a scaled-up representation of a further surface according to the invention modified from FIG. 2b.
Figure 4A:
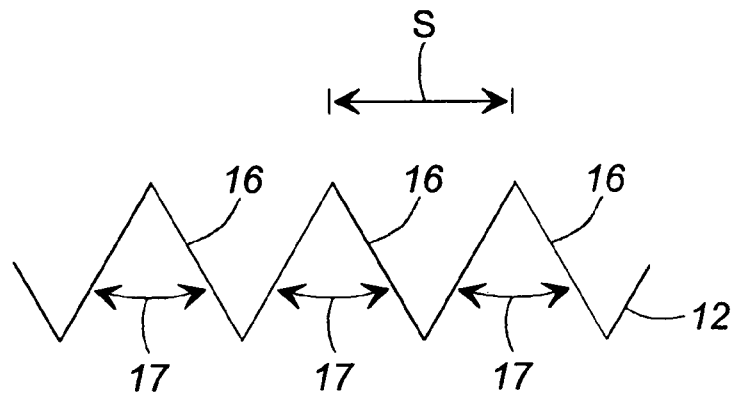

The reduction of the wall friction obtained with the surface 2 in the embodiments a.) and b.) according to FIG. 2, compared to a smooth reference surface, are shown in FIG. 3. Here, the standardized reduction in wall friction delta tau/tau$_o$ in percent is plotted against a standardized lateral distance s$^+$ between the ribs. The standardized lateral distance between s$^+$ the ribs is calculated using $$s^+ = (s/ny) * \sqrt{(tau_o/\text{rho})}$$

from the actual lateral distance s between the ribs, the wall shear stress tau$_o$ of the smooth reference surface, which is subject to the same flow, the density rho of the specific fluid and the kinematic viscosity ny of the fluid. The standardization of the lateral distance between ribs to s+ results in a kind of Reynolds number and is approximately proportional to the flow speed to which the wall is subjected. The two curves in the middle of FIG. 3 relate to the surfaces 2 according to FIG. 2a.) and 2b.), with the upper middle curve given by upright triangles representing the surface according to FIG. 2a.) and the lower middle curve given by inverted triangles representing the surface according to FIG. 2b.). It can be seen from FIG. 3 that a reduction of the wall friction by 7% as opposed to a smooth reference surface is obtained with these two surfaces for a wide range of s+, i.e. for a wide range of flow speeds. By comparison, the top curve given by stars only achieves a maximum reduction in wall friction of 5%. The top curve according to FIG. 3 corresponds to the surface 12 represented in FIG. 4a.) having directly adjacent, wedge-shaped ribs 16 and a wedge angle 17 of approximately 60°. This surface 12 corresponds to EP 0 205 289 A 1. With this surface 12, the reductions in wall friction of 10% and more, which are maintained, are in fact not achieved.

Figure 4B:
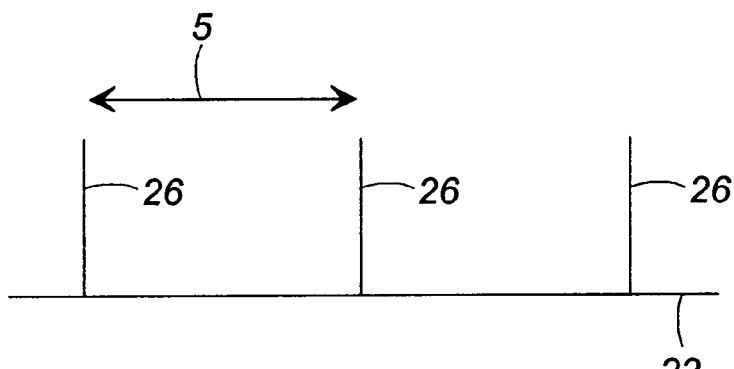

Such reductions in wall friction are only obtainable using surface 22 indicated in FIG. 4b.) showing individual straight ribs 26. The curve at the extreme bottom of FIG. 3 corresponds to the surface represented in FIG. 4b.) with the individual measuring points given by an x. The reductions in wall friction of up to 10% shown are unfortunately only theoretical, as the surface 22 according to FIG. 4b.) is not readily producible and would not show sufficient stability of the ribs 26 even if producible.

Figure 5:
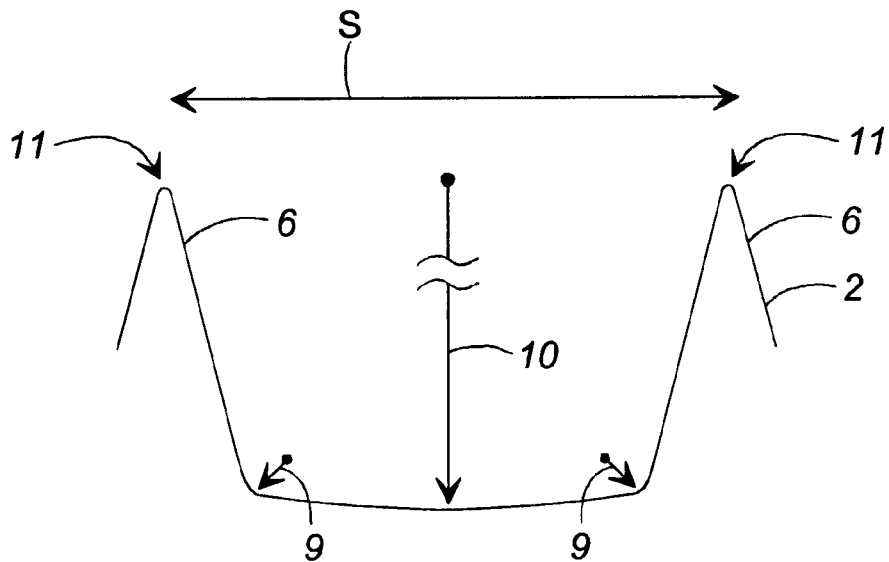
Figure 6:
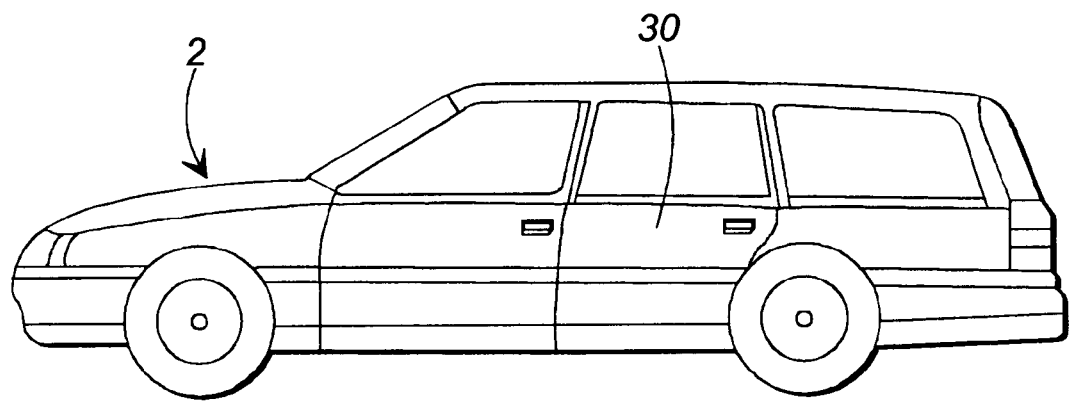
FIG. 6 is a depiction of the surface on a vehicle.
Figure 7:
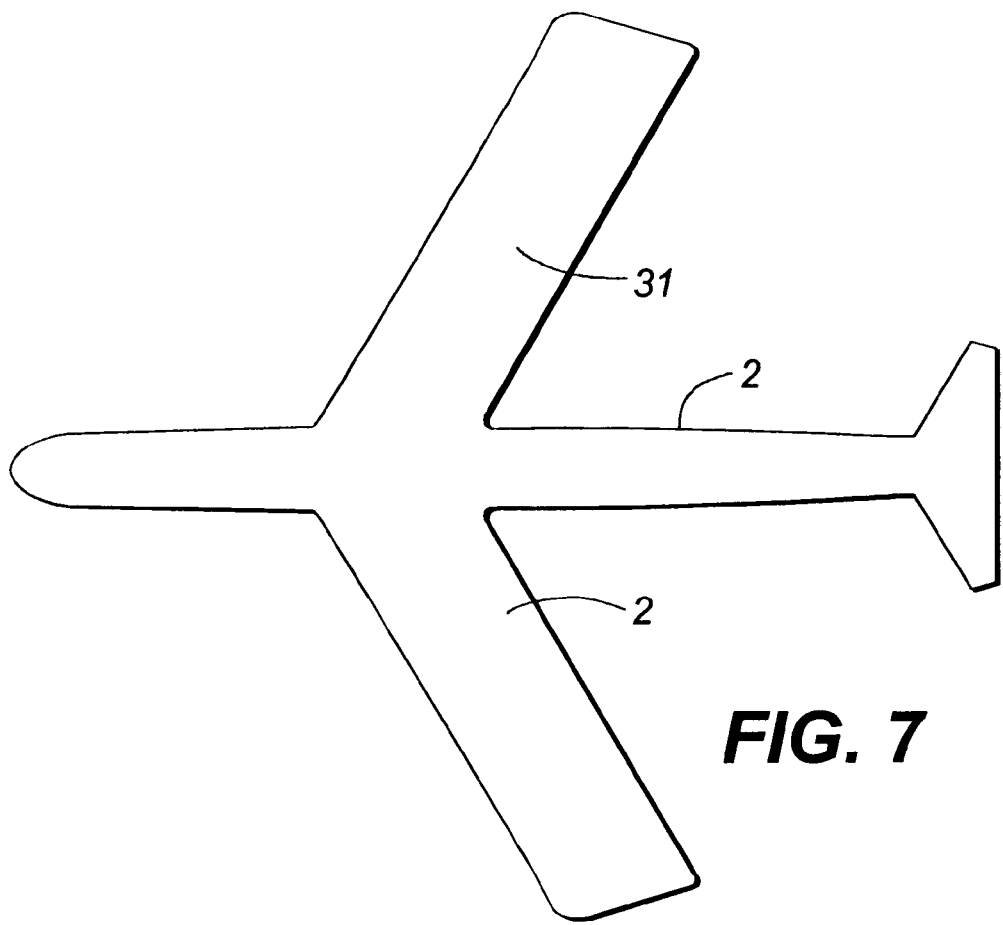
FIG. 7 is a depiction of the surface on an aircraft.

The surfaces 2 according to invention which are shown in FIG. 2 are producible. In addition, they can be modified in order to further increase their producibility and stability. This is indicated in FIG. 5. In this Figure, the attachment bases of the ribs 6 have a radius of curvature 9 and between two adjacent ribs 6 the surface 2 has a radius of curvature 10. However, the radius of curvature 9 is less than 20% of the lateral distance between s the ribs and the radius of curvature 10 is more than twice as large as the lateral distance s between the ribs. Curvatures 11 at the free ends 6 of the ribs show a radius which is smaller than 2% of the lateral distance s between the ribs. Although the producibility of surface 2 is further improved as well as its stability is increased to an even greater degree by the curvatures of the surface 2, almost the same reductions in wall friction are still obtained as with the surface according to FIG. 2b.) shown in FIG. 3.

Drawing Reference Legend
1—wall
2—surface
3—flow
4—turbulence
5—main direction of flow
6—rib
7—wedge angle
8—height
9—radius of curvature
10—radius of curvature
11—radius of curvature at rib tip
12—surface
16—rib
17—wedge angle
22—Surface
26—rib
30—vehicle
31—airplane
s—lateral distance between the ribs
s+—standardized lateral distance between the ribs
tau—wall shear stress
tau$_o$—wall shear stress of a smooth reference surface
rho—density of the fluid
ny—kinematic viscosity of the fluid

I claim:

1. A surface for a wall subject to a turbulent fluid flow in a main flow direction, said surface comprising projecting ribs having a height and being oriented in the main flow direction and spaced apart from each other in a direction lateral to the main flow direction, said height of said ribs being in the range of 45% to 60% of said lateral spacing between adjacent ones of said ribs, and wherein said ribs are wedge-shaped with a wedge angle in the range of 20° to 50°.

2. The surface of claim 1, wherein a standardized lateral spacing between said ribs $$s^{30} = (s/ny) * \sqrt{(tau_0/\text{rho})}$$

is in the range of 12 to 22, where s$^+$ is the absolute, non-standardized lateral spacing between the ribs, tau is a wall shear stress of a smooth reference surface subject to the same fluid flow, rho is the density of the fluid, and ny is the kinematic viscosity of the fluid.

3. The surface of claim 2, wherein said standardized lateral spacing $s^+$ between said ribs is selected to provide optimum drag reduction at a cruise speed of a vehicle having said surface.

4. The surface of claim 1, wherein the lateral spacing between said ribs is in the range of 0.04 to 0.10 mm.

5. The surface of claim 1, wherein said ribs have attachment bases and wherein said attachment bases of said ribs have a radius of curvature of at most 20% of the lateral spacing between said ribs.

6. The surface of claim 1, wherein said surface between said ribs has a radius of curvature of at least 200% of the lateral spacing between said ribs.

* * * * *